United States Patent [19]

Lammers et al.

[11] Patent Number: 5,010,984
[45] Date of Patent: Apr. 30, 1991

[54] POWER TRANSFER ASSEMBLY WITH ONE-PIECE RETAINER RING

[75] Inventors: Bryan G. Lammers, Washington; David M. Fee, Groveland, both of Ill.

[73] Assignee: Caterpillar Inc., Peoria, Ill.

[21] Appl. No.: 544,292

[22] Filed: Jun. 7, 1990

[51] Int. Cl.⁵ .............................. F16D 55/36
[52] U.S. Cl. .................. 188/71.5; 188/170; 192/70.27; 192/91 A; 192/109 A
[58] Field of Search ........... 192/70.27, 91 A, 109 R, 192/109 A, 30 V, 89 B; 403/DIG. 7; 188/71.5, 170, 72.4; 267/161

[56] References Cited

U.S. PATENT DOCUMENTS

| | | | |
|---|---|---|---|
| 2,380,677 | 7/1945 | Schjolin | 192/89 B X |
| 2,700,444 | 1/1955 | Ahlen | 192/89 B X |
| 3,266,608 | 4/1965 | Lemieux | 192/85 AA |
| 3,353,641 | 11/1967 | Chana | 192/109 A X |
| 3,612,237 | 10/1971 | Honda | 192/85 AA |
| 3,837,439 | 9/1974 | Piret | 188/72.6 |
| 4,291,792 | 9/1981 | Henao | 192/109 A X |
| 4,371,066 | 2/1983 | Fujioka et al. | 192/85 AA |
| 4,440,281 | 4/1984 | Hauguth | 192/89 B X |
| 4,465,170 | 8/1984 | Marchisio | 192/89 B X |
| 4,646,892 | 3/1987 | Takeuchi et al. | 192/89 B X |
| 4,947,966 | 8/1990 | Huff | 188/170 |

FOREIGN PATENT DOCUMENTS

| | | | |
|---|---|---|---|
| 2123502 | 2/1984 | United Kingdom | 188/71.5 |
| 2149863 | 6/1985 | United Kingdom | |

Primary Examiner—Rodney H. Bonck
Attorney, Agent, or Firm—Claude F. White

[57] ABSTRACT

A power transfer assembly with a one-piece retainer ring includes a housing, a plurality of alternating rotatable and non-rotatable friction discs, a power actuated piston, a spring washer, a cushion spring between the piston and the friction discs, and a retaining ring for retaining the spring washer in place. The one-piece retainer ring includes a first retainer portion positioned within a recessed groove in the housing and a second portion in contact with the spring washer. Prior art clutch and brake assemblies utilize several types of retaining rings and reaction type wear members to retain and react against a spring element. These prior art devices required two or more members to provide the retention and reaction functions. The subject combination retainer and wear ring is a one-piece member.

8 Claims, 2 Drawing Sheets

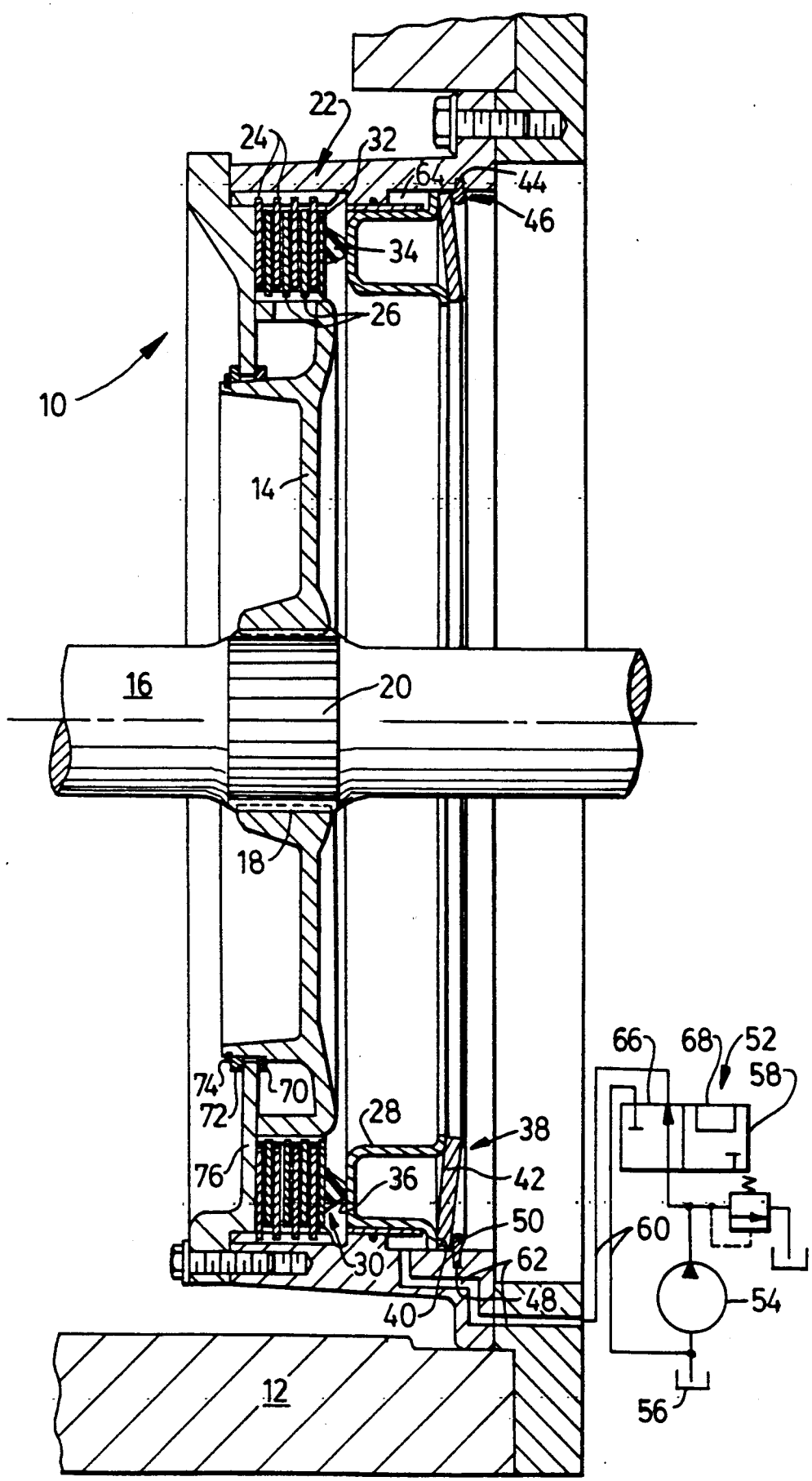

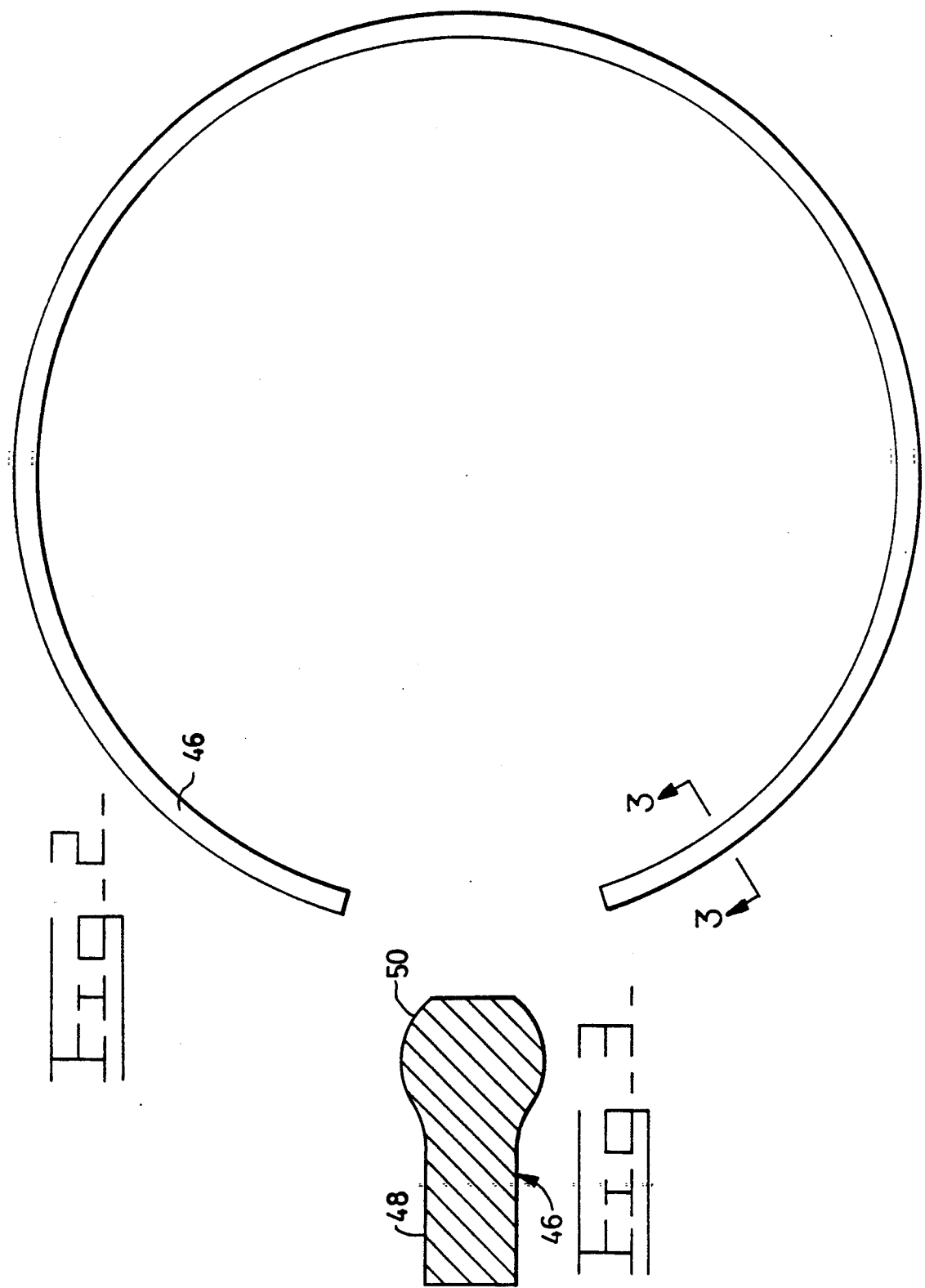

POWER TRANSFER ASSEMBLY WITH ONE-PIECE RETAINER RING

TECHNICAL FIELD

This invention relates generally to a power transfer assembly, such as a brake or clutch assembly, and more particularly to such an assembly having a spring which actuates a piston member and a one-piece retainer and wear ring acting against the spring.

BACKGROUND ART

Brake and clutch assemblies, which utilize large diameter multiple stationary and rotating discs for the braking and clutching functions, are generally actuated and released by mechanical and fluid pressure means. Many of the prior art brake/clutch assemblies are actuated by a compressed spring mechanism and are released by fluid pressure acting through a piston against the spring mechanism. The spring mechanism is generally held in place by a split retaining ring and reacts against a separate and distinct reaction member. The two separate members, the retaining ring and the reaction member, require additional space in the assemblies and additional expense.

The present invention is directed to overcoming one or more of the problems as set forth above.

DISCLOSURE OF THE INVENTION

In one aspect of the present invention, a power transfer assembly includes a stationary housing, a rotatable hub, a rotatable power shaft connected to the hub, and a plurality of first and second friction discs splined respectively to the housing and the hub. The power transfer assembly further includes a powered piston, a cushion spring positioned between the piston and the friction discs, power means for moving the piston and a one-piece retainer and wear ring in contact with the power means.

Power transfer assemblies, such as clutch and brake assemblies, utilize multiple friction discs for the clutching and braking functions. Portions of the friction discs are normally stationary and another portion of the friction discs are rotatable. The stationary and rotating discs are brought into engagement with each other, to provide the clutching and braking functions, by various types of power means. The friction discs are disengaged by a power means also. The power means include various types of compressed springs and pressurized fluid cylinders. In many of the prior art assemblies, the friction discs are engaged by one or more compressed springs and are disengaged by a pressurized fluid cylinder. Belleville type springs are often used as the power means. A retention ring is generally used to retain this type of spring within the assembly and a separate wear ring is utilized for the spring to react against.

The subject invention provides a simple and inexpensive one-piece retainer and wear ring, which retains the belleville type spring and reacts against the spring.

BRIEF DESCRIPTION OF THE DRAWINGS

FIG. 1 is a diagrammatic sectional view of a brake assembly incorporating the one-piece retainer and wear ring of the present invention;

FIG. 2 is a diagrammatic enlarged plan view of the one-piece retainer and wear ring of the present invention; and FIG. 3 is a diagrammatic sectional view taken generally along the lines 3—3 of FIG. 2.

BEST MODE FOR CARRYING OUT THE INVENTION

Referring to the drawings, a power transfer assembly 10, such as a friction disc brake assembly 10, has a stationary non-rotatable housing 12, a rotatable hub 14, and a rotatable power shaft 16 connected to the hub 14 by splines 18 on the hub 14 and mating splines 20 on the shaft 16. Rotary motion is imparted from the shaft 16 to the hub 14 through the connection of the splines 18, 20. The brake assembly 10 further includes a disc pack 22 having a plurality of first friction discs 24 and a plurality of second friction discs 26. The first discs 24 are splined to the housing 12 and the second discs 26 are splined to the hub 14, with each of the first discs 24 being adjacent at least one of the second discs 26. A powered piston 28 is positioned within the housing 12 and is moveable relative to the housing 12 toward and away from the disc pack 22.

A floating cushion spring 30 is positioned within the housing 12 between the piston 28 and the friction discs 24, 26. The cushion spring 30 preferably includes a rigid plate-like portion 32 and a resilient portion 34. The rigid portion 32 is adjacent the friction discs 24, 26 and the resilient portion 34 is adjacent a first surface portion 36 of the piston 28. A first power means 38 is positioned within the housing 12 against a second surface portion 40 of the piston 28. The first power means 38 is preferably a compressible spring washer 42 of the belleville type and is adapted to move the piston into contact with the cushion spring 30. The housing 12 has an annular recessed groove 44 and a one-piece retainer and wear ring 46 is secured within the groove 44.

The one-piece retainer and wear ring 46 is preferably a split ring member having a first portion 48 positioned with the groove 44 and a second portion 50 in contact with the spring washer 42. The first portion 48 has a substantially rectangular shape in cross-section and the second portion 50 has a substantially bulbous shape in cross-section. The second portion 50 acts as a reaction and wear member for the spring washer 42.

A second power means 52 provides the power to move the piston 28 away from the cushion spring 30 and hold the spring washer 42 in a compressed state. The second power means 52 includes a source of fluid pressure, including a fluid pump 54, a reservoir 56, a control valve 58, fluid lines 60, fluid passageways 62, and a fluid cylinder 64. The control valve 58 is moveable between a first position 66 and a second position 68. In the position of the brake assembly 10 illustrated in FIG. 1, the piston 28 is retracted against the spring washer 42 and the brake assembly 10 is de-activated.

Industrial Applicability

With reference to the drawings, the subject power transfer assembly 10 is particularly useful with earthmoving and construction vehicles, but can be advantageously utilized with other types of vehicles which have spring actuated friction disc clutch or brake assemblies.

With the brake assembly 10 in the position shown in FIG. 1, the power shaft 16, the hub 14, and the friction discs 26 are rotating. The piston 28 is retracted against the spring washer 42 and holds the spring washer 42 in a compressed inactive position. The piston 28 is held in this retracted position by fluid pressure in the cylinder 64, which is supplied by the pump 54, control valve 58, lines 60, and fluid passageways 62. To actuate the brake assembly 10, and thereby stop the rotation of the shaft 16, the hub 14, and the friction discs 26, the control valve 58 is moved from the first position 66 to the second position 68. With the control valve 58 in the second position, pressurized fluid is drained from the cylinder 64, the fluid passageways 62, and the fluid lines 60 back to the reservoir 56.

Once the fluid cylinder 64 is devoid of pressurized fluid, the spring washer 42 pivots about the second portion 50 of the one-piece retainer and wear ring 46 and moves the piston 28 forward against the cushion spring, which then moves against the friction discs 24 and 26. As the rotating discs 26 and the non-rotating discs 24 are forced together, the frictional contact stops the rotation of the discs 26, the hub 14, and the shaft 16. The braking action is now complete and the piston 28 and spring washer 42 remain in this position until pressurized fluid is once again supplied to the cylinder 64.

To release the braking action, the control valve 58 is moved to the first position 66 and pressurized fluid is directed into the cylinder 64. This fluid moves the piston 28 rearward and compresses the spring washer 42 as it pivots about the second portion 50 of the one-piece retainer and wear ring 46. The force on the friction discs 24 and 26 is thereby relaxed and the discs 24, 26 separate. In this condition, the shaft 16, the hub 14, and the friction discs 26 can be rotated once again.

With particular reference to FIG. 1, it is to be noted that the hub 14 in substantially "free-floating" without being supported by any type of bearings. As previously stated, the floating hub 14 is connected to the power shaft 16 by the mating splines 18, 20, and is also splined at the exterior portion to the second friction discs 26. The floating hub 14 is restricted in its lateral movement by first and second control rings 70, 72, a snap ring 74, and a housing plate 76.

Other aspects, objects, and advantages of this invention can be obtained from a study of the drawings, the disclosure, and the appended claims.

We claim:
1. A power transfer assembly, comprising:
a stationary non-rotatable housing;
a rotatable hub;
a rotatable power shaft splined to said hub;
a plurality of first and second friction discs splined respectively to said housing and to said hub, each of said first friction discs being adjacent at least one of said second friction discs;
a powered piston positioned within and moveable relative to said housing;
a cushion spring positioned between said piston and said friction discs;
first power means for moving said piston into contact with said cushion spring; and
a one-piece retainer and wear ring secured within said housing and in contact with said first power means, said one-piece retainer and wear ring including a split ring member having first and second portions, said first portion having a substantially rectangular shape in cross-section, and said second portion having a substantially bulbous shape in cross-section.

2. The assembly, as set forth in claim 1, wherein said housing has a recessed groove therein and said first portion of said split ring member is adapted to fit within said groove.

3. The assembly, as set forth in claim 1, wherein said second portion of said split ring member is adapted to contact said first power means.

4. The assembly, as set forth in claim 1, wherein said first power means includes a spring washer of the belleville type.

5. The assembly, as set forth in claim 4, wherein said housing has a recessed groove therein, said one-piece retainer and wear ring has first and second portions, said first portion being positioned within said groove, and said second portion being in contact with said spring washer.

6. The assembly, as set forth in claim 1, including second power means for moving said piston away from said cushion spring.

7. The assembly, as set forth in claim 6, wherein said second power means includes a fluid cylinder and a controllable source of pressurized fluid adapted to be supplied to said fluid cylinder.

8. The assembly, as set forth in claim 1, wherein said rotatable hub is free-floating and is free of bearing support within said housing.

* * * * *